Sept. 3, 1957  H. A. MICHAELIS  2,805,314
FRYING APPARATUS
Filed April 23, 1954  4 Sheets-Sheet 1

INVENTOR
HAROLD A. MICHAELIS
BY
ATTORNEY

Sept. 3, 1957  H. A. MICHAELIS  2,805,314
FRYING APPARATUS
Filed April 23, 1954  4 Sheets-Sheet 2

INVENTOR
HAROLD A. MICHAELIS
BY
ATTORNEY

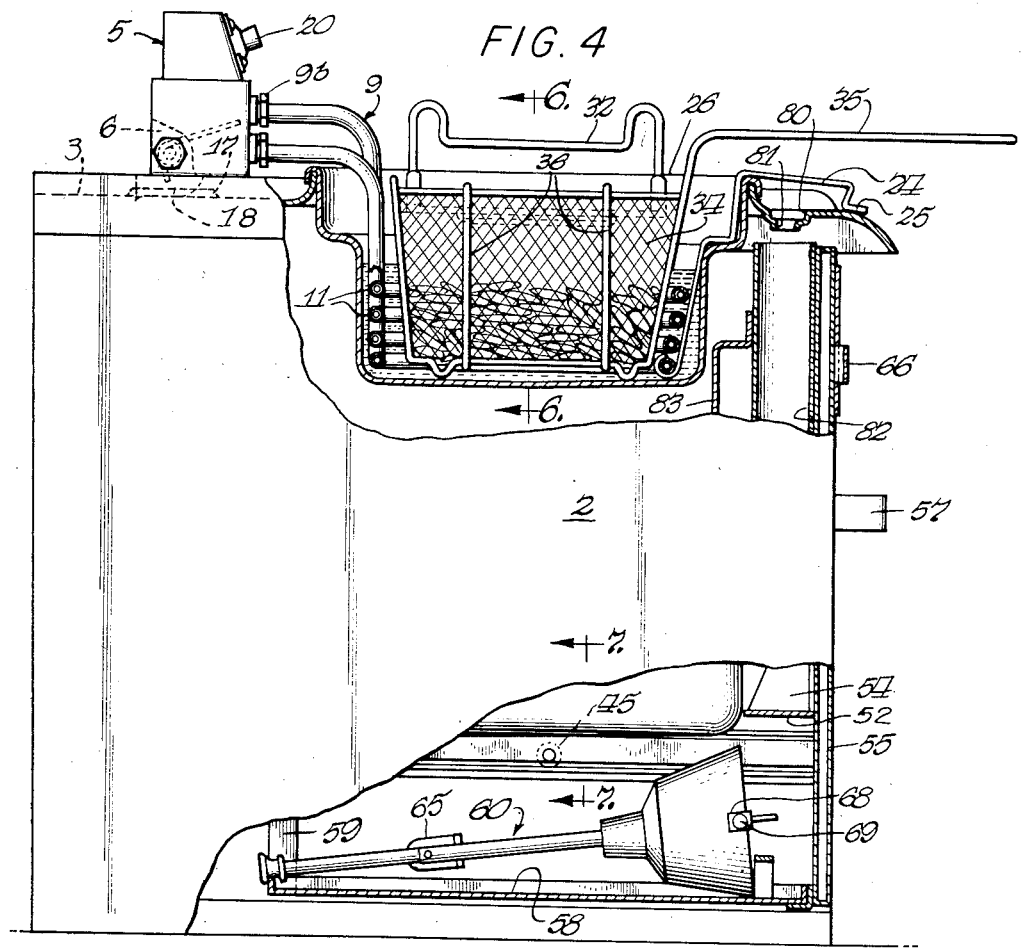
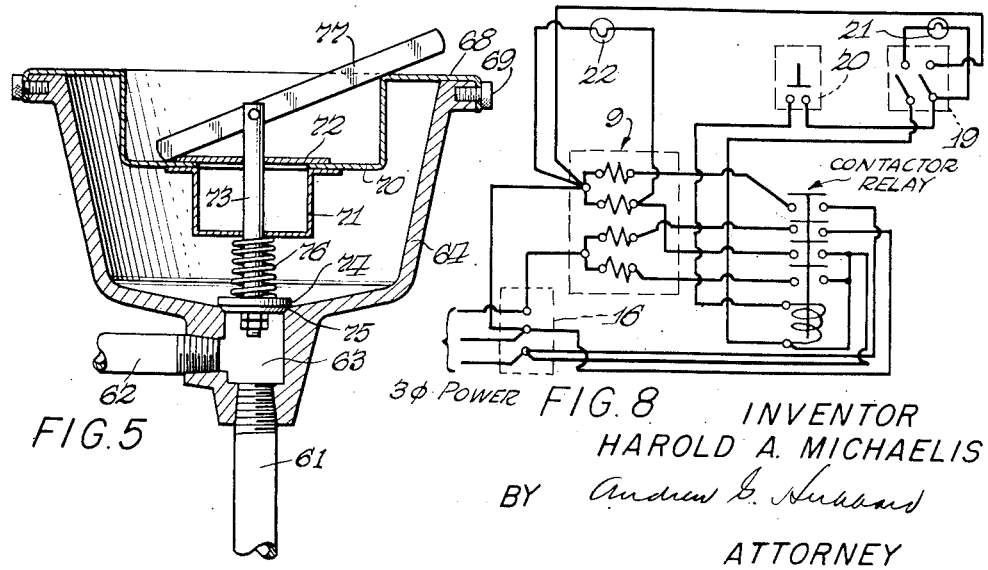

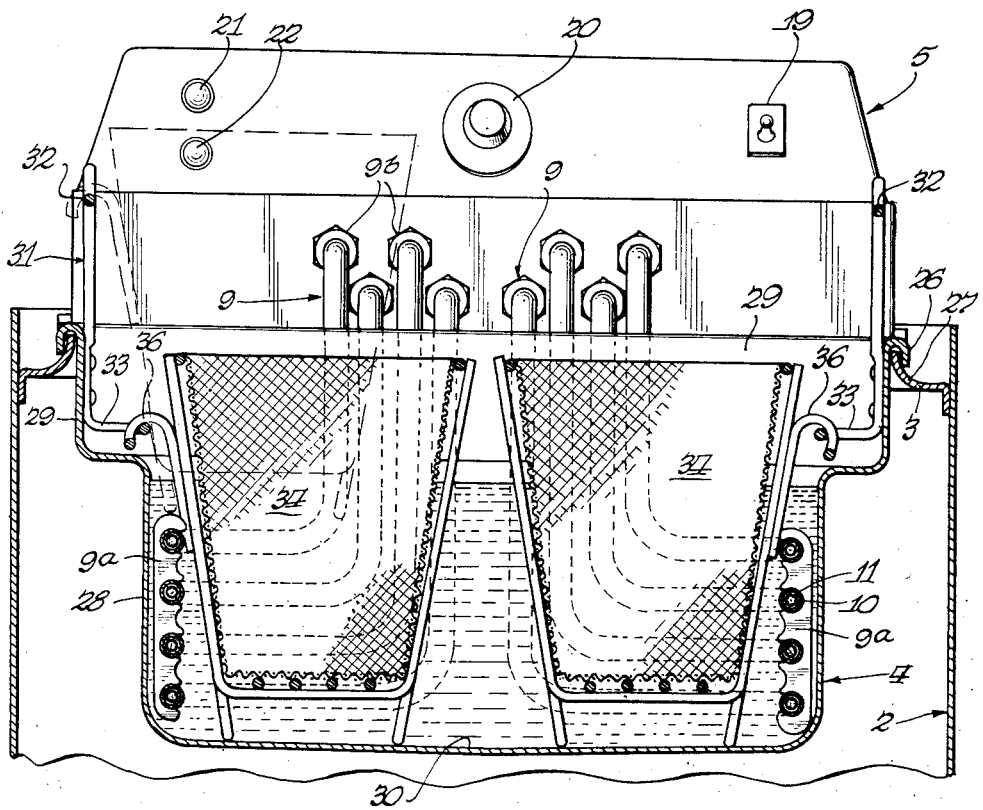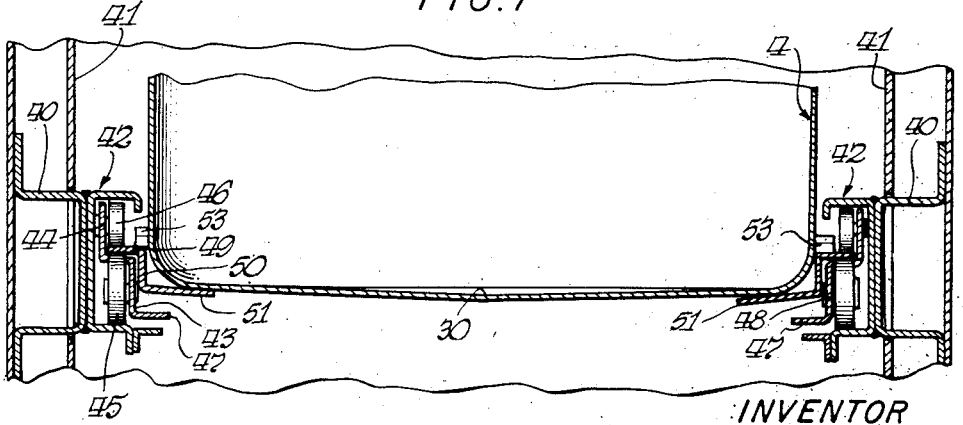

United States Patent Office 2,805,314
Patented Sept. 3, 1957

2,805,314

FRYING APPARATUS

Harold A. Michaelis, Elmhurst, Ill., assignor to General Electric Company, a corporation of New York Application April 23, 1954, Serial No. 425,200

11 Claims. (Cl. 219—43)

This invention relates to frying apparatus such as fry kettles for use in the preparation of edibles such as potatoes, sea foods, meats, etc., and has for its principal object the provision of frying apparatus which is efficient in operation, economical in fat usage, and cleanable with a minimum of "out-of-service" time.

It is well known that the quality of deep-fat fried foods drops sharply if the cooking fat breaks down chemically by polymerization due to prolonged high temperatures. Contamination by food particles accelerates the breakdown. The rate of breakdown is most rapid in fry kettles which have a fat capacity too large for the daily frying volume of the operations served. If such kettles are turned off during slack periods, they are slow to regain cooking temperature. In commercial establishments such as restaurants and the like in which there may be calls for fried foods at various and unpredictable times of the day, the chef is therefore inclined to keep the kettle always at cooking temperature, and because the breakdown of cooking fat by polymerization is essentially a time-temperature function, the maintenance of high cooking temperature hastens fat deterioration. Cleaning is difficult in fry kettles of the conventional type in which the fat container, in which the foods are cooked, is a non-removable structure, and the heating elements are fixed within the container. It is necessary completely to shut down the fry kettle and to drain the fat into some other container for storage during the cleaning period. In busy establishments, the chef is reluctant to have his fry kettle out of service for a substantial time interval, and cleaning and fat straining are often neglected.

The replacement cost of cooking fat in such conventional fry kettles has been high. It is an accepted fact, for example, that from 15 to 20% of fat is absorbed by the food in frying. However, unless the remaining 80 to 85% of the fat is kept in good condition by protection against prolonged overheating and against contamination by accumulations of food particles, the addition of "make-up" fat will not maintain the total volume in good condition, and consequently, frequent complete replacements may be necessary. The difficulties of straining the fat and cleaning the ordinary fixed-container fry kettle have made it desirable for restaurants of high product quality to install additional kettles in order to have spare capacity for use while one or more of the kettles is shut down for cleaning.

It is, therefore, an object of my invention to provide deep fat frying apparatus having means for quickly and effectively straining and reconditioning the fat; to provide apparatus in which the cooking fat may be brought quickly up to cooking temperature, whereby the chef may take the apparatus completely out of service during slack periods; and to provide means whereby straining the fat and removing the cooking container for cleaning, at a convenient later time, may be accomplished in a manner which does not take the apparatus out of service for more than a few minutes.

The present invention accomplishes the above-noted objectives by reducing the fat capacity of the fat containers and increasing the heat input thereto so as to reduce the time required to restore cooled fat to cooking temperature, and by providing duplicate, removable, fat containers, either of which may be placed in operative relation with the heat source. By syphonic means, the hot fat content of one container may be quickly strained into a duplicate container for immediate reuse. In this latter respect, the invention makes it possible easily to remove the first container and to move the second into its place in the apparatus for immediate resumption of the cooking operation. In apparatus embodying the invention, the fat container holds but twenty-eight pounds of cooking fat and the heat input is twelve kilowatts. With this relationship of input to fat quantity, the fat will heat from 75° F. to 350° F. in five minutes. Even if the chef has shut down the kettle completely during a slack period of an hour or more, the recovery rate is so fast that cooking temperature may be regained while the chef is assembling the material for the order and the counterman is completing the set-up. By means of the improved straining and fat handling facilities embodied in the present invention, fat may be strained from one container into another and the first container washed and restored to the "spare" position within the frying apparatus in less than eight minutes, during which time the second container, with the strained fat, has been in operative position and thus availablfe for cooking operations. Obviously, the dirty container may be cleaned at any convenient time, because the fry kettle is in service meanwhile.

Other features and advantages of the invention will be apparent from the following detailed description of a presently preferred embodiment, read in the light of the accompanying drawings in which:

Fig. 4 is a side sectional elevation of the apparatus, partly in section, showing the apparatus in operation;

Fig. 5 is a side sectional elevation of means for priming the fat-transfer device;

Fig. 6 is a front elevation of the apparatus, taken on lines 6—6 of Fig. 4;

Fig. 7 is a front sectional elevation of the apparatus, taken on lines 7—7 of Fig. 4 and showing the auxiliary fat container arranged in the pull-out drawer; and Fig. 8 is a schematic wiring diagram.

Figure 1:
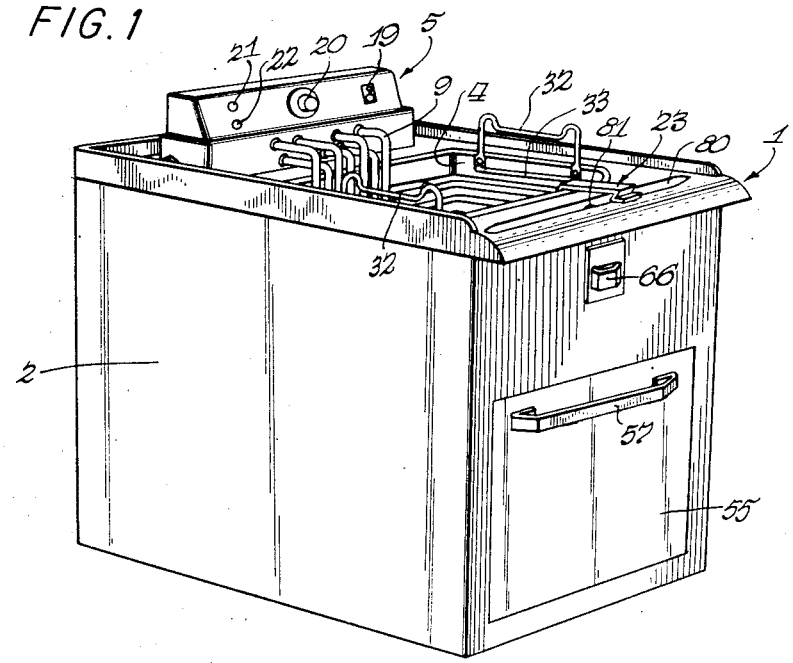
Fig. 1 is a perspective view of the frying apparatus ready to receive the baskets in which the foods are placed for cooking.
Figure 2:
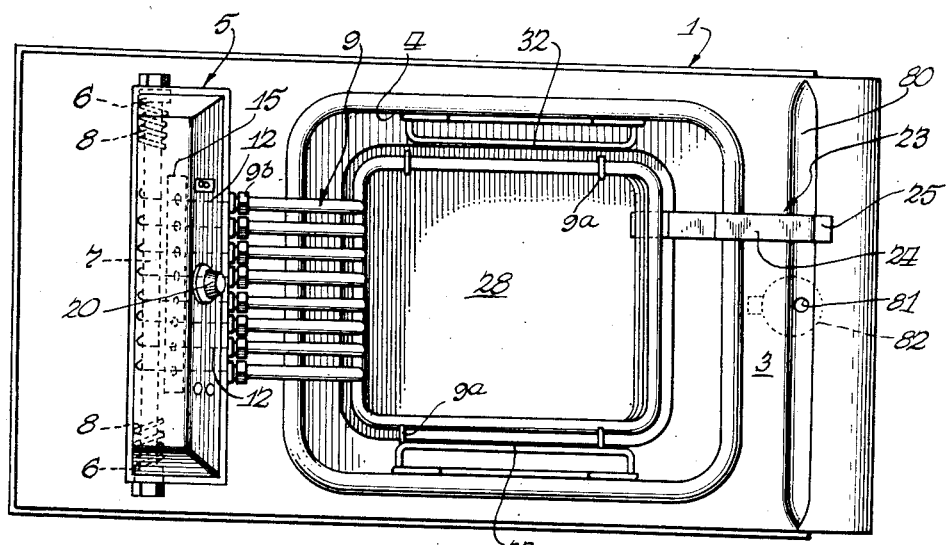
Fig. 2 is a top plan view thereof.
Figure 3:
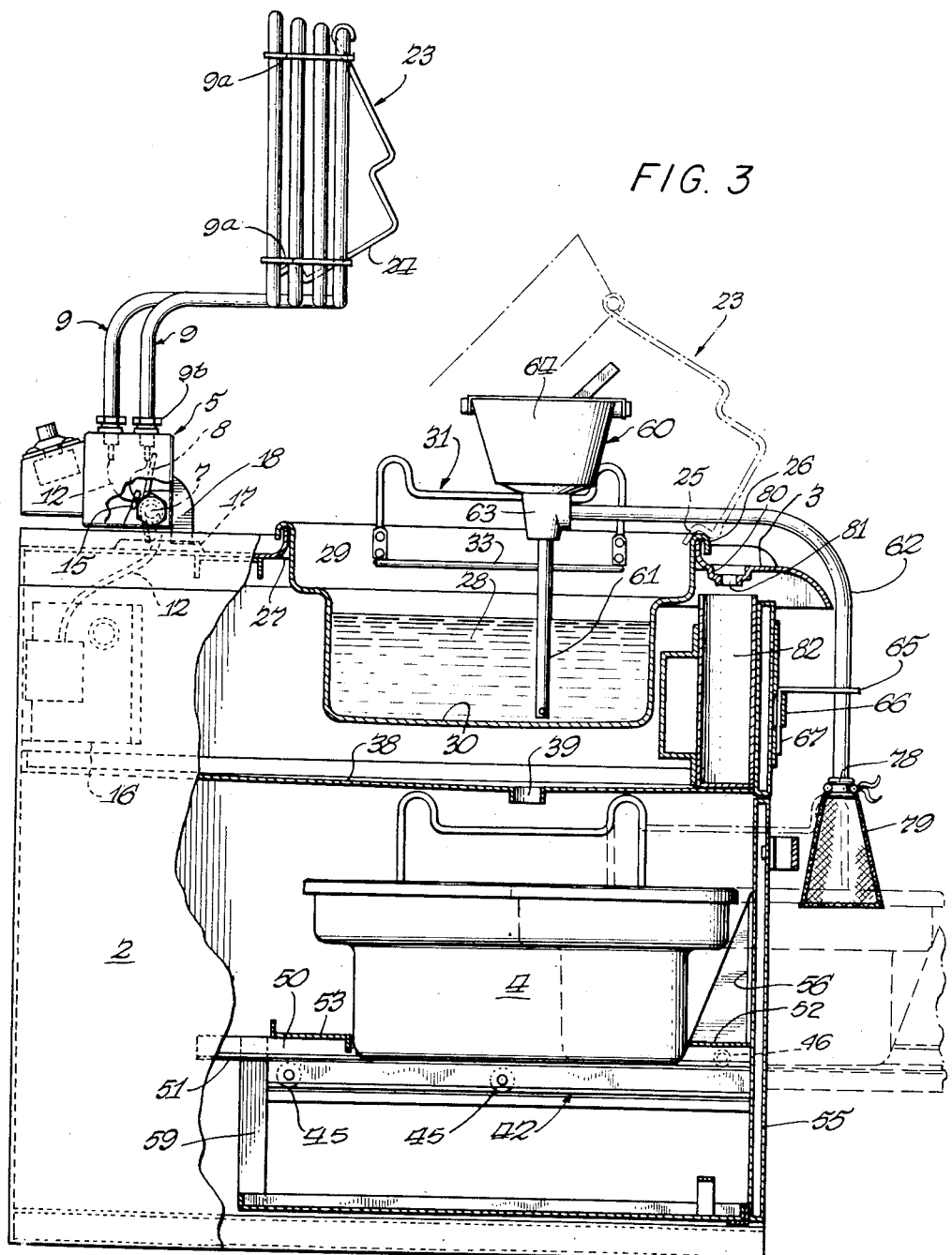
Fig. 3 is a side elevation, partly in section, showing the heating elements raised out of the fat container and the fat-transfer device in position.

In Figs. 1 and 2, the frying apparatus 1 comprises a structurally rigid housing 2 having an upper panel 3. By means of multiple structural wall constructions, as indicated in Figs. 3 and 7, dead air spaces provide adequate thermal insulation. The upper panel or deck 3 is arranged to receive a fat container 4. A box-like control head 5 is mounted on said upper deck at the rear thereof, and, as best shown in Fig. 3, is arranged to be swung between its Fig. 3 and Fig. 4 positions. A convenient manner of mounting the control head is by means of lugs 6 fixed to and extending upwardly from the main housing structure within the end walls of the control head. Said lugs rotatably receive a hinge shaft 7, having at each end suitable counterbalancing springs 8. The control head is structurally constituted to serve as the mounting or support for a plurality of electrical heating elements 9, which are preferably of the tubular sheathed conductor type shown in the C. C. Abbott Patent No. 1,367,341, dated February 1, 1921, and now well known in the electrical heating art. Such heating elements in the present instance comprise a helically wound resistance wire 10 (Fig. 6) imbedded in a highly compacted mass of electrically insulating and thermally conducting material such as finely divided magnesium oxide enclosed by the tubular stainless steel sheath 11. Such heating elements are self-cleaning, for when they are raised out of the kettle and the electrical power turned on for a brief interval, the fat clinging thereto will be carbonized and easily brushed from the sheath. The terminal ends of the heating element sheaths are secured to the front wall of the control head by any suitable connection fittings. It will be noted by comparison of Figs. 2 and 6, that there is a bank of four heating elements, each arranged in substantially rectangular form so as relative closely to follow the walls of the container 4. As is now well known, such arrangement improves the heat distribution within the container. At the side and rear walls, the heating elements are in vertical alignment, where as at the front the convolutions are in a rearwardly stepped arrangement as best shown in Fig. 4. The heating element terminals are staggered so that, as viewed in Fig. 2, they are in a non-overlapping relationship. The spacing of the individual heating units is maintained by spacer plates 9a and by the rigid securement of the terminal ends of the sheath to the connection head. Such securement is conveniently by means of threaded compression fittings 9b. The lead wires 12 to each heating terminal 14 may be maintained in a non-tangling relationship by threading each lead wire through an insulated spacing strip 15 (Figs. 2 and 3) suitably supported within the control head. The lead wires are preferably looped around the hinge shaft 7, and pass, as schematically illustrated in Fig. 3, to a connection box 16 at the rear of the housing. A second insulated spacing strip (not shown) may be provided for the leads, either within or closely adjacent to the connection box. The building power leads (not shown) will be suitably connected to the heating element leads at the connection box. Protection of heating unit leads by looping around a hinge shaft is disclosed in Shroyer U. S. Patent 2,009,790, granted July 3, 1935, for "Cooking Apparatus." The top deck 3 is, of course, provided with an aperture (defined by a raised rim 17) to accommodate the leads. When the control head is in its swung back position, the arcuate guard plate 18, fixed to the control head for movement therewith, protects the leads against exposure, and the interior of the control head and the housing are protected against entry of fat by drippage or splashing.

The electrical circuit, schematically shown in Fig. 8, includes an on-off switch 19 (shown in Fig. 6, as of the toggle type) a conventional hydraulic thermostat 20 and pilot lights 21, 22, to indicate the "on" time of the heating units. The thermostat is preferably arranged with its temperature sensitive bulb supported by one of the heating elements in parallel relation thereto, as shown in Shroyer Patent 2,134,675, granted October 25, 1938, for "Frying Apparatus."

The heating unit may be swung between its positions shown respectively in Figs. 3 and 4, and to an intermediate position, by means of a handle 23 which preferably comprises a rigid metal strip looped about the front pass of the lowermost heating unit, as best appears in Fig. 4. The handle is slidable and freely rotatable on the heating unit, and is formed so that with the heating units in lowered position, it extends upwardly in front of the heating units and then follows the wall configuration of the fat container 4, leaving said fat container to provide a hand-grip portion 24 spaced above the front apron of the top panel 3. When the heating element is raised to its Fig. 3 position, the handle occupies a position in which it may be grasped without possibility of accidental contact with the heating units. The heating unit may be supported in an angular position above the kettle by swinging it partly up and positioning the notched portion 25 of the handle over the front rim of the kettle. This is the preferred position when burning the heating unit clean.

The fat container 4 is formed with a rolled rim 26 which fits about the upstanding edge 27 of the opening in the top of panel 3, whereby the fat container is supported within the housing 2. It will also be noted that the container has a well portion 28 within which the actual cooking is done; said well portion extends downwardly from an enlarged upper portion 29 which comprises a foaming chamber, as is well known in the art. The bottom of the container slopes to a substantially centrally disposed low portion 30. Finally, the container includes the handle 31 at each side wall; each handle is advantageously of heavy wire formed with the upper horizontal run 32 between raised end loops and the outwardly extending run 33 which projects inwardly from the sides of the container in parallelism therewith.

The actual cooking is done within one or more wiremesh baskets 34, having a rigid wire framework arranged to support the baskets above the bottom of the fat container, as shown in Figs. 4 and 6. The baskets have a strong handle portion 35 and spaced hook members 36. When the baskets are in cooking position, the hook members may fit loosely over the portions 33 of the handle 31, although the baskets are supported on their own feet on the bottom of the container. When the baskets are raised to draining position following cooking, as indicated by the broken line representation of the left basket in Fig. 6, the hook portions 36 carry the basket on the run 32 of the container handle and the lower portion of the basket rests against the run 33 of the container handle.

The cooking portion of the apparatus is separated from the storage portion 37 thereof by a wall 38 which preferably slopes toward a drainage opening 39 in the front central portion of the wall. Opening 39 facilitates the complete scouring of the inner portion of the apparatus. The housing is constructed with rigid channels 40 in coplanar relation at each side. Said channels may extend through openings in the inner side walls 41 of the housing and securely carry the channels 42 which serve as trackways for a relatively conventional drawer slide assembly. In passing, it will be noted that the inner side walls 41 terminate at the wall 38.

As shown in Figs. 3 and 7, the slide assembly may include angular side rails formed with vertical walls 43 and 44, to which the plurality of rollers 45 and 46 are pivotally attached, and horizontal walls 47 and 48. The side rails of the slide assembly are tied together by a front transverse structural member (not shown) extending between the bottom flanges 47 at the front portions thereof. The respective rollers are arranged in the usual fashion of having the larger rollers 45 at the center and rear of the vertical wall 43, and the smaller rollers 46 at the center and front of the upper wall 4. The lower rollers extend through openings in the horizontal wall 48, and the respective center-located rollers 45 and 46 are spaced apart sufficiently for the easy slidable passage of the upper horizontal flange 49 of the auxiliary fat container support structure. Said structure includes side rail portions having a vertical wall 50 and a lower horizontal flange 51. The container support structure comprises, also, spaced transverse members 52, 53 at the front and rear respectively which permit the auxiliary fat container 4 to rest securely upon the flanges 51. At the front, the container support has triangular gussets 54 extending upwardly from the front transverse tie plate 52. The drawer front 55 may be secured to vertical flanges 56 at each gusset 54. A drawer handle 57 is suitably secured to the drawer front. As best shown in Fig. 4, the drawer has a transversely extending bottom 58 which is carried by the front panel 55 and rigid hangers 59 at the rear of each side of the container support structure.

The drawer has no side walls and the bottom 58 thus provides a side-access tray on which may be stored the fat-transfer device 60, presently described. It will be apparent therefore that when the drawer is pulled forwardly, the auxiliary fat container 4 may be removed from its supporting structure. The respective upper and lower rollers of the drawer slide assembly support the drawer structure, as is well understood.

Fig. 3 illustrates the apparatus arranged to transfer the fat from the upper to the lower container during which transfer the fat is strained. The transfer apparatus 60 comprises a syphon having an inlet tube 61 and an outflow tube 62 intercommunicating at a connection fitting 63 forming the base of a priming cup 64. Inlet 61 is open-ended and preferably has a plurality of supplemental inlet holes as shown. Outflow tube 62 is sufficiently rigid to serve as the main support structure. A rigid angle member 65 is welded or otherwise securely affixed to said tube and, on the front wall of the housing, I securely mount a strap member 66, having means providing a flat passage through which the flat leg portion 67 of member 65 passes. The vertex of the angle member rests against the upper edge of the wall defining said passage to position the intake tube 61 just above the bottom of the container.

It is obvious that the fat transfer apparatus comprises a syphon, and, in order to start the syphonic action, it must be primed. This is very simply accomplished in the priming cup 64, shown in Fig. 5. A valve mechanism includes a strap member 68 which extends diametrically across the top of the priming cup and is affixed thereto by any suitable means such as the screws 69. The strap has a U-shaped center portion 70 within the priming cup, and fixed to the underside thereof is a U-shaped valve stem guide 71. Said guide 71 and an upper guide plate 72 slidably receive the valve stem 73 which is fitted with a valve disc 74, arranged to cooperate with a valve seat formation 75 at the upper edge of the connection fitting 63. The valve is biased to a normally closed position by means such as the coil spring 76 bottomed on the guide 71. A valve operating lever 77 is pivotally attached to the guide stem 73, and it will be obvious that when the lever is manually rotated counter-clockwise of Fig. 3, the valve disc will be raised from its seat. It will be understood that the priming cup has a capacity sufficient to fill tube 61, and tube 62 to below the bottom of the tube 61. To begin the syphonic action therefore, the chef ladles liquid fat from container 4 to substantially fill the priming cup 64 and raises the valve stem. The fat will drain from the priming cup into the respective tubes whereupon the action will begin. The chef recloses the valve when it is apparent to him that the syphonic action is progressing.

A thimble 78 is fixed about the discharge tube 62 to provide for the removable attachment of a draw-string provided bag-like strainer 79 of suitable washable fabric.

The front portion of the deck 3 is preferably formed with a drainage trough 80 having the central opening 81 through which fat or other accumulations on the deck may pass into a collector 82. When the upper container 4 has been removed following drainage into the lower container, the chef may reach into the housing, grasp the handle 83 of the collector and remove the collector for emptying and cleaning if necessary.

In using the frying apparatus, the chef places one of the fat containers 4 into the well in the upper deck 3, lowers the heating unit into position, and—assuming that he is using plastic hydrogenated cooking fat—places the charge of fat in the container, heaping it up about the heating units so as to cover them. The temperature control is then set at 250° F. and the switch 19 closed. Pilot light 21 is lighted so long as switch 19 is closed, and pilot 22 goes on and off as the thermostat cycles. The lights therefore will indicate that the apparatus is in proper operation. When it is certain that the heating unit will be submerged in melted fat, the temperature control is set at the degree recommended by the cooking recipe.

Straining the fat is a simple matter. This is particularly advantageous when breaded foods are being prepared, for the fat should be strained frequently. The chef turns the heating unit off and swings it to the "up" position. He pulls the lower drawer partly out, applies the strainer bag to the lower end of tube 62 and positions the draw-off device. Then after priming the device, the liquid fat will strain into the lower container 4 by syphonic action. The upper container and the draw-off device are removed to the pot sink for cleaning, the lower container placed in cooking position and when the heating unit is again returned into the container, the chef can, if necessary, add the proper amount of make-up fat to restore the apparatus to full operating condition.

While there has been described what is at present considered to be the preferred embodiment of the invention, it will be understood that various modifications may be made therein, and it is intended to cover in the appended claims all such modifications as fall within the true spirit and scope of the invention.

I claim:

1. Frying apparatus, comprising a housing, a fat container supported therein for immediate removal therefrom and arranged to receive foods for cooking in said fat, said container being devoid of openings or passages below the level of cooking fat therein, means for heating the fat to cooking temperature, a drawer in said housing below said fat container, a second fat container substantially identical with said first container removably carried by said drawer, and means for draining fat from said first container into said second container, whereby the emptied first container may be removed from the housing for cleaning or the like and the apparatus immediately thereafter restored to operative condition by replacing the first container with the fat-containing second container.

2. Frying apparatus comprising a housing, a fat container supported therein for immediate removal therefrom and arranged to receive foods to be cooked in the fat, means including immersion electric heating elements for heating the fat within said container to the desired cooking temperature, means for withdrawing said heating elements from said container, a second fat container substantially identical with said first container removably disposed within said housing below said first container, means for supporting said second container for guided movement outwardly of said housing while maintaining said container in substantially vertical alignment with said first container, and syphon means arranged for removable attachment to said housing and having an inlet pipe extending substantially to the bottom of said first fat container and a discharge pipe extending forwardly and downwardly of said housing to discharge into said second fat container when the same is partially withdrawn from said housing, whereby the heating elements may be withdrawn from the first container, the fat content of the first container may be substantially entirely transferred to the second container to permit removal of said first container for cleaning and the like and the substitution therefor by the second container upon the removal thereof from said housing for substantially immediate resumption of the cooking operation upon moving the heating units into operative position within said second container.

3. Frying apparatus as in claim 2, in which said syphon means includes means for straining the fat during the transfer of fat from the first to the second container.

4. Frying apparatus as in claim 2, in which said syphon means includes a bag-like strainer removably affixed to the discharge pipe for straining the fat during the transfer of the fat from the first to the second container.

5. Frying apparatus, comprising a housing, a fat container removably supported therein and arranged to receive foods for cooking in said fat, means including a plurality of electrical heating elements for immersion in said cooking fat to heat said fat to cooking temperature, each said heating element comprising a metal sheathed heating unit formed as a loop in close adjacency to the walls of said container, said loops being mounted in vertically spaced relation one to the other, means for mounting said heating elements for pivotal movement as a group into or out of said container, handle means pivotally mounted on the lowermost of said heating units, said handle means being configurated to swing, when the group of heating elements is moved to a position out of said container, to a position in which the major portion of said handle means is outside of the space enclosed by said heating units, means for electrically energizing said heating elements regardless of the position thereof relative to said container, a second fat container substantially identical with said first fat container removably supported within said housing below said first container, and means for straining fat from said first container into said second container, whereupon after the heating units have been moved out of said first container the emptied first container may be removed from the apparatus for cleaning or the like and the apparatus restored to operative condition by replacing the first container with the fat-containing second container and returning the said heating units to operative position within said second container.

6. Frying apparatus, comprising a housing, a fat container supported therein for immediate removal therefrom and arranged to receive foods for cooking in said fat, said container being devoid of openings or passages below the line of cooking fat therein, means including a plurality of rigid electrical heating elements for immersion in said cooking fat to heat said fat to cooking temperature, means including a rigid structure pivotally supported on said housing rearwardly of said container for mounting said heating elements for pivotal movement as a group into or out of said container, means for energizing said heating elements, a pull-out drawer in said housing below said fat container, a second fat container substantially identical with the first container removably mounted within said drawer above a bottom shelf thereof, syphon means normally stored on said bottom shelf below said second fat container, and means on said housing for mounting said syphon means on an external wall thereof to drain fat from said first container into the second, whereupon after moving the said heating units out of said container the emptied first container may be removed from the apparatus for cleaning or the like and the apparatus restored to operative condition by replacing the first container with the fat-containing second container and moving said heating units into operative position within said second container.

7. Frying apparatus, comprising a housing having a flat upper deck portion, a fat container removably supported therein and arranged to receive foods for cooking in said fat, means including a plurality of rigid electrical heating elements for immersion into said fat to heat said fat to cooking temperature, a box-like structure pivotally mounted along a rear edge to said housing deck portion rearwardly of said container, said heating elements being fixedly mounted on a wall of said structure whereby said structure comprises a main support for said heating elements and upon being rotated relative to said housing will swing said heating elements upwardly out of said fat container, means for connecting electrical lead wires to terminal portions of said heating elements and for conducting said lead wires through an opening in said housing deck portion to a connection box within said housing, said opening being covered by a wall of said structure when the said heating elements are in operative position, guard plate means fixed to said pivoted box-like structure intermediate said heating elements and said housing and extending through said opening in close proximity to the forward edge thereof to protect the interior of said housing and said box-like structure against entry of fat thereinto when said heating units are in their upwardly swung position and means for electrically energizing said heating elements regardless of the position thereof relative to said container.

8. Frying apparatus, comprising a housing, a fat container removably supported therein and arranged to receive foods for cooking in said fat, means including a plurality of tubular metal sheathed rigid electrical heating elements for immersion in said cooking fat to heat said fat to cooking temperature, means including a rigid wall pivotally supported on said housing rearwardly of said container for mounting said heating elements for rotation as a group in a vertical arc into or out of said container, a rigid handle pivotally and slidably attached about the sheath of one of said heating elements for effecting such movement, a second fat container substantially identical with said first container and removably carried within said housing below said first container, means carried by said housing externally of said first container for emptying the fat content of said first container into said second container, means for supporting said heating elements in position removed from said container to clear said container for removal thereof from said housing and the substitution therefor by said second container, means for supporting said heating elements in a position removed from said cooking fat but intermediate the immersed position and said first-named removed position, and means for energizing said heating elements while in said intermediate position.

9. Apparatus as in claim 8, in which said heating elements supporting means comprises said rigid handle.

10. Apparatus as in claim 9, in which said rigid handle is formed at its free end with a hook-like portion for engagement over a rim of either of said containers.

11. Frying apparatus, comprising a housing, a fat container supported therein for immediate removal therefrom and arranged to receive foods for cooking in said fat, said container being devoid of openings or passages below the level of the cooking fat therein, means for heating the fat to cooking temperature, a storage chamber in said housing below said fat container, a second fat container substantially identical with said first container, means for removably supporting said second fat container within said storage chamber, and means for draining fat from said first container into said second container, whereby the emptied first container may be removed from the housing for cleaning and the like, and the apparatus immediately thereafter restored to operative condition by replacing the first container with the fat-containing second container.

References Cited in the file of this patent
UNITED STATES PATENTS

| | | |
|---|---|---|
| 1,869,903 | Lichtenberg | Aug. 2, 1932 |
| 2,134,675 | Shroyer | Oct. 25, 1938 |
| 2,164,789 | Sheldon | July 4, 1939 |
| 2,215,929 | Husk | Sept. 24, 1940 |
| 2,232,998 | Cernohouz | Feb. 25, 1941 |
| 2,287,396 | Roth | June 23, 1942 |
| 2,610,740 | Hunter | Sept. 16, 1950 |
| 2,664,490 | Allgeyer | Dec. 29, 1953 |
| 2,668,898 | Behren | Feb. 9, 1954 |